April 8, 1952     A. D. WILSON ET AL     2,592,224
METHOD OF MAKING MARGARINE AND THE RESULTING PRODUCT
Filed March 23, 1949                           3 Sheets-Sheet 3

INVENTORS
ARTHUR DACRE WILSON
HENRY BOWEN OAKLEY
BY   JOHN ROURKE

THEIR ATTORNEYS

Patented Apr. 8, 1952

2,592,224

UNITED STATES PATENT OFFICE 2,592,224

METHOD OF MAKING MARGARINE AND THE RESULTING PRODUCT

Arthur Dacre Wilson, Hornchurch, Henry Bowen Oakley, Bromborough, and John Rourke, Bebington, England, assignors to Lever Brothers Company, Cambridge, Mass., a corporation of Maine Application March 23, 1949, Serial No. 83,076
In Great Britain April 1, 1948

8 Claims. (Cl. 99—122)

This invention relates to improvements in the manufacture of margarine.

A continuous process of manufacturing margarine is known in which liquid fat is mixed with aqueous ingredients in the desired proportions and the mixture subjected to continuous rapid chilling and simultaneous emulsification in a processing apparatus commonly known as a Votator. This type of apparatus is described in A. E. Bailey, "Industrial Oil and Fat Products," Interscience Publishers Inc., New York (1945), pages 702 to 708. This Votator comprises one or more thin walled nickel tubes surrounded by a cooling medium such as evaporating liquid ammonia. The tubes are provided with internal rotating blades which remove the thin film of chilled material from their walls. After chilling, the mixture, which is nucleated with minute fat crystals, passes to a unit where crystallization of the fat is completed. The margarine, so formed, is subjected to some form of mechanical working such as passage through a wire mesh or kneading in a mechanical blender.

Margarine made in the above described manner has a tendency to be harder, more brittle and thus less "spreadable" than is desired, to be lacking in salt taste, and to be what is known as "heavy" or "thick" on the palate. This latter undesirable character is not necessarily associated with the hardness of the material, since it can be present in soft plastic fats; conversely, some very hard products can be "thin" on the palate. The "heaviness" or "thickness" on the palate appears to arise from failure of the margarine to melt sufficiently quickly in the mouth to a thin liquid state; instead, as will be described in more detail later, it remains on the palate for an appreciable time in a viscous, pasty condition.

Another identifying characteristic of margarine is its body. A simple device for measuring the body of a margarine is the so-called Brabender "Plastograph" which is a viscosimeter developed in the starch industry for measuring the amount of work required to knead dough. It is essentially a stirring device provided with a dynamometer for measuring resistance of the margarine to the stirring operation. The initial test procedure is to start the Brabender "Plastograph" charged with margarine and to take the viscosity readings at regular short-time intervals. The resistance of the margarine to working drops rapidly at first, but at the end of about five minutes, the resistance to working of a good grade margarine levels off, i. e., remains constant. An initial resistance reading is taken thirty seconds after the "Plastograph" is started, and this is followed by five readings at one minute intervals. The body of the margarine is usually calculated as the total of the six readings minus the initial reading. It will be apparent that a margarine having a body low enough to permit easy spreading and yet not so low as to be in almost liquid form, is superior to a thick margarine having a relatively high body and hence a high Brabender value.

The photomicrographic structure of margarine made in the conventional manner is characterized by a very large number of very small aqueous droplets and tests made on such margarine reveal an average Brabender value in the neighborhood of 3000. Likewise, tests conducted on samples of margarine available on the market under a variety of trade names, from two to four days after manufacture, indicate that these products have an average Brabender value of about 3000.

Though the occurrence of "thickness" is naturally influenced to a considerable extent by the proportion of triglycerides present which melt at or near the temperature of the mouth, it is also affected by the manner of treatment of the margarine, as suitable adjustments to the conditions under which the margarine is processed may, in some cases, give different degrees of thickness in margarines made from the same blend of materials.

One object of the present invention is to provide a continuous process which will result in a product of improved "thinness," "spreadability" and body.

It has been discovered that a margarine which is less heavy on the palate is obtained when the liquid fat is cooled and agitated so as to separate some or all of the glycerides which melt at or near the temperature of the mouth, as crystalline particles prior to chilling and emulsification. Such glycerides will be hereinafter referred to as "higher melting point glycerides."

Thus according to the present invention there is provided a continuous process of manufacturing margarine which comprises the steps of cooling and agitating a stream of liquid fat so as to separate higher melting point glycerides therein as crystalline particles, mixing the fat with the aqueous ingredients in the desired proportions for producing margarine either prior to or after the step of cooling and agitating, and subjecting the resultant mixture to continuous rapid chilling and emulsification.

The stream of fat may be agitated simultaneously with or subsequent to cooling and for best results the agitation should be carried out for a sufficient length of time to allow a high proportion of the higher melting point glycerides, capable of separating out as crystalline particles at the temperature to which the fat is cooled, to so separate out.

Cooling may be effected by passing the stream of fat through a heat exchange device such as a conduit surrounded by a cooling medium. It is not essential to cool the whole of the fat which it is desired to chill and emulsify; for example 75% of the fat may be cooled and this cooled fat then agitated with the remaining uncooled fat prior to rapid chilling and emulsification. Cooling may also be effected by passing a part of the chilled and emulsified mixture back into the stream of fat after mixing the latter with the other ingredients of the emulsion. These other ingredients may, if desired, be added to the fat before cooling the latter in any of the above mentioned ways.

It is believed that the "thickness" and brittleness of the margarine is caused by substantially all the solid components of the fat being in the form of very minute crystals. This crystal structure is caused by the rapid chilling which seeds the fat with a large number of minute crystal nuclei. Owing to their large number they can grow to small crystals during the subsequent setting of the emulsion. The presence of the higher melting point constituents of the fat in this form, and perhaps in the form of solid solutions with the lower melting components, imparts a thick viscous character to the partly melted mass in the mouth, giving the "heavy" or "thick" sensation referred to above. By previously separating out the higher melting point constituents of the fat blend according to the present invention, this "thick" characteristic may be reduced. In the finally solidified margarine these crystalline particles, having dimensions of the order of about 3 to 10 microns, are embedded in a matrix of minute crystals of the lower melting point constituents entraining the liquid components of the margarine, which readily melt in the mouth to give a thin and fairly plastic margarine.

The "spreadability" of a plastic material such as margarine should be such that it will easily spread and blend with other components. This is a function of its resistance to breakdown under working.

As to body it has been found that margarines available on the market under various trade names have Brabender values averaging about 3000 and that margarine prepared in accordance with the method of the present invention has a Brabender value of 1500. Margarine made with the same stock as the margarine having a Brabender value of 1500 but not made in accordance with the method of this invention was found to have, like the margarines available on the market, a Brabender value of about 3000. This indicates that the method of the present invention results in a margarine differing from that made by conventional methods.

The "thinness" and "spreadability" of the margarine produced is controlled by the degree to which the fat is cooled and agitated prior to final chilling.

The temperature of the fat on leaving the unit in which crystallisation takes place prior to final chilling will hereinafter be referred to as the "pre-crystallization temperature". Variations in the "pre-crystallization temperature" result in wide differences in the "thinness," "spreadability" and body of the margarine produced by the present invention.

It has been found that the "precrystallization temperature" is higher than the temperature to which the fat is first cooled, as heat of crystallization is liberated during the crystallization process. For example, in the case of a particular blend of fats cooled to 20° C., it was found that the precrystallization temperature was 25° C.

It is found that in general the precrystallizing temperatures for most blends of fats have optimum values extending over a range of 20° C. It has been further found that these optimum temperatures are all above 23° C. and below 34° C., the exact value of the optimum temperature within this range 23° C. to 34° C. depending on the composition of the fat-blend and the degree of thinness required.

The nature of the agitation to which the fat is subjected during precrystallization is an important aspect of the invention, as it is found that the "thinness" of the margarine produced is affected by the degree of violence of this agitation. If the stirring is not sufficiently vigorous, the completeness of crystallization fails to approach the total equilibrium amount appropriate to the precrystallization temperature, and therefore the "thinness" and "spreadability" of the product is impaired. With some blends, insufficient agitation may also cause the beneficial effects of precrystallization to be masked by the growth of the crystals in groups, a tendency which can be overcome by either more violent agitation or by using a lower "precrystallization temperature", or both.

The view that the "thickness" of margarine is due to its slowly melting in the mouth to a thick viscous liquid is supported by observations of the behaviour of a block of margarine when it is placed on a hot plate kept at body temperature. A margarine which is thick and heavy, such as is obtained by the unmodified continuous process on certain blends, sinks very slowly on the hot plate, whereas one of the same blend which has been made by the improved process of the present invention sinks much more rapidly. Moreover, the material which exudes over the hot plate from the base of the block is a semi-solid pasty mass in the first case and is a fluid cream or very thin paste in the second case. The test illustrates the kind of effect which may be expected to occur when margarine is placed in the mouth.

To carry out this test in practice, a half pound block of margarine of dimensions 4 inches x 2½ inches x 1½ inches is placed with its 2½ inches x 1½ inches face on a hot plate kept at 38° C. and is loaded with 500 grams. The amount by which the block sinks in a given time, say in ten minutes is measured. A thick margarine such as is produced by the unmodified continuous process is found to sink less than 10 mm., usually about 5 mm., in 10 minutes. A margarine made by the present process will sink at least 15 mm. in the same time. This figure is the minimum considered desirable for a thin margarine, and higher figures, for example 20 to 30 mm. or even up to 40 or 45 mm. may be obtained by suitable choice of the working conditions.

The consistency of the margarine produced by the above process may be improved and any lumps therein dispersed by homogenizing the chilled and emulsified material after it leaves the chilling and emulsification unit of the Votator and before entering the unit where crystallization of the fat is completed. Any known method and means for homogenizing an emulsion may be used. It is preferred however to use the method and means disclosed in co-pending application Serial No. 83,034. This method comprises homogenizing the stream of chilled and emulsified material by passing it through one or more mesh screens before the said material has completely set, causing said stream to undergo a sudden change in its direction of flow after passage through each mesh screen and allowing the material to set to its final consistency with the minimum of interference by forces liable to cause shearing therein.

Several embodiments of the method of the invention will now be described with reference to the accompanying drawings, wherein.

Figure 1:
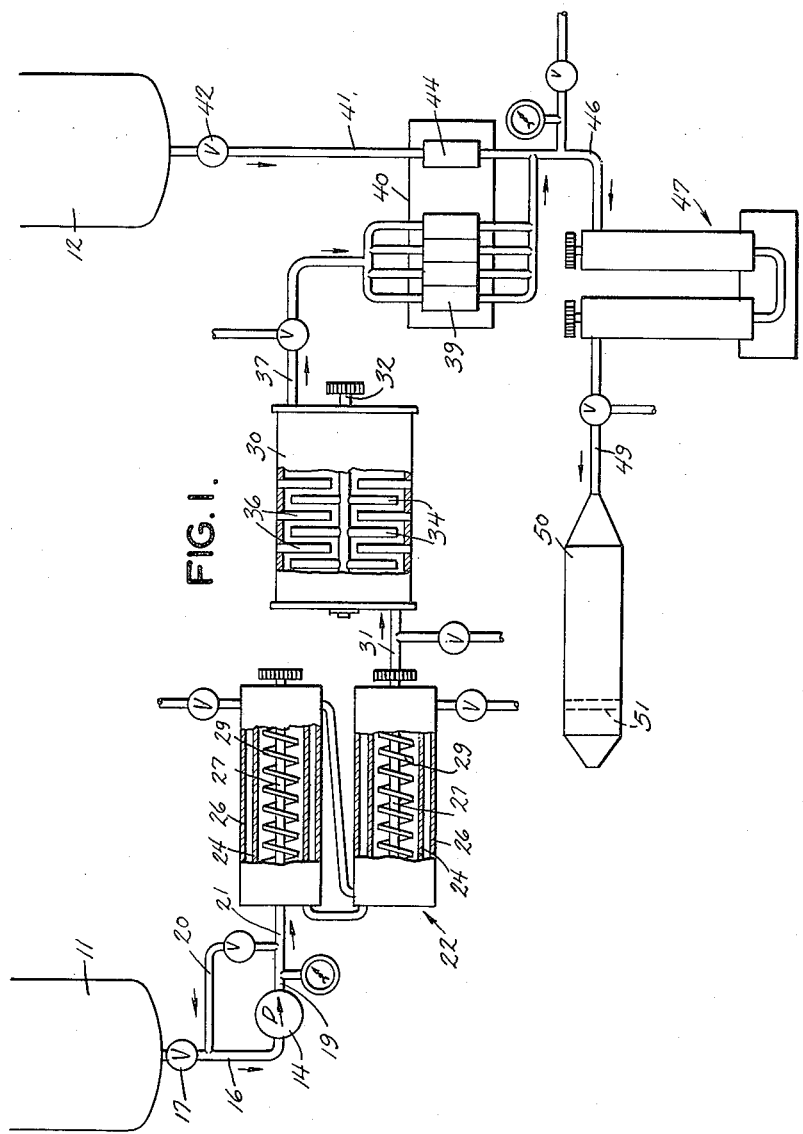
Figure 1 is a schematic flow sheet illustrating one embodiment.

Various safety valves and pressure gauges shown in the drawing are not numbered or specifically described inasmuch as they do not form a part of the invention.

Referring to Figure 1, 11 is a reservoir for the liquid fat and 12 is a reservoir for the aqueous ingredients of margarine. Reservoir 11 is connected to a rotary pump 14 by a conduit 16 provided with a control valve 17. The delivery conduit 19 of pump 14 is connected to conduit 16 by a by-pass conduit 20 and by conduit 21 to a cooling unit 22 consisting of four series-connected tubes 24, only two of which are shown. Each tube 24 of the cooling unit 22 is surrounded by a water or brine jacket 26 and is fitted with an axial shaft 27 carrying helical scrapers 29. The cooling unit 22 is connected to a precrystallizing unit 30 by a conduit 31. This precrystallizing unit consists of a cylinder fitted with an axial shaft 32 carrying a row of radial rods 34 helically arranged through 120° and intermeshing with an array of fixed rods 36 attached to the wall of the cylinder. A conduit 37 connects the unit 30 to cylinders 39 of a proportioning pump 40 and a conduit 41, provided with a control valve 42, connects cylinder 44 of the proportioning pump 40 to reservoir 12. The cylinders 39 and 44 of the proportioning pump 40, which preferably are such as to supply material from reservoirs 11 and 12 automatically in the correct proportions, are connected by conduit 46 to a Votator unit 47. Conduit 49 connects this Votator unit with a unit 50 which consists of a large diameter tube fitted with wire mesh screens 51 and in which crystallization of the fat is completed. This unit 50 may be connected to suitable working or packing apparatus.

In operation, valves 17 and 42 are opened, and liquid fat is drawn from reservoir 11 and circulated through conduits 16, 19 and 20 by the pump 14. A major proportion of this circulating stream of fat is drawn through conduit 21 into the tubes 24 of the cooling unit 22 by the proportioning pump 40. The scrapers 29 in the tubes 24 are rotated at about 120 revolutions per minute and the flow of water or brine through the jacket 26 is adjusted to cool the fat to the desired degree. Small crystal nuclei of the high melting point glycerides are formed and are carried by the fat stream into the precrystallizing unit 30. By the time the liquid leaves the precrystallizing unit 30, a high proportion of the higher melting point glycerides capable of separating out as crystalline particles at the temperature attained by the fat will have separated, provided the agitation caused by the rods 34 on the shaft 32 is sufficiently vigorous.

Cylinders 39 and 44 of the proportioning pump 40 are adjusted to supply this precrystallized fat from the precrystallizing unit 30 and aqueous ingredients from reservoir 12, respectively, in correct proportions to the Votator unit 47 through conduit 46. Rapid chilling and emulsification takes place in the Votator in the manner already described.

The chilled and emulsified material entering tube 50 consists of an emulsion of super-cooled liquid fat as the continuous phase containing a very large quantity of crystal nuclei of the low melting point glycerides together with a proportion of large higher melting point glyceride crystalline particles. This material sets in the tube 50 to a margarine containing a mass of uniformly small, low melting point glyceride crystalline particles with a proportion of large, substantially discrete, high melting point glyceride crystalline particles dispersed therein. This margarine may be worked by passage through the wire mesh screen 51 in tube 50 and also, if desired, by other mechanical working devices attached to tube 50. The product obtained is less heavy on the palate than that obtained without precooling the fat.

Figure 2:
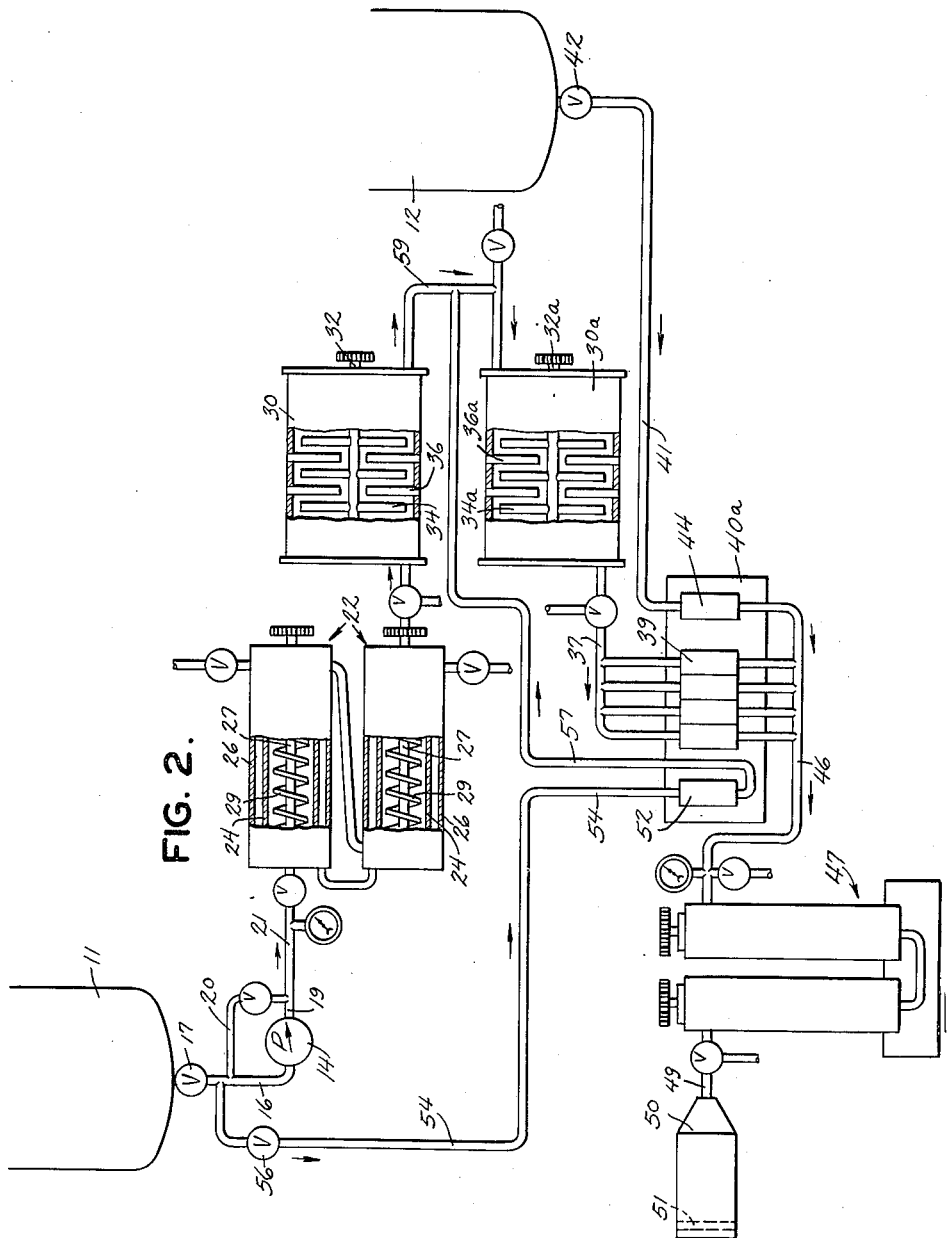
Figure 2 is a schematic flow sheet illustrating another embodiment.

Figure 2 shows an alternative embodiment of the method in which a part only of the fat is precooled. Referring to this figure, the arrangement of apparatus is practically the same as that shown in Figure 1, except that a cylinder 52 of proportioning pump 40a is connected by branch conduit 54 provided with a control valve 56 to conduit 16 and delivers through a conduit 57 into another conduit 59, which connects the precrystallizing unit 30 with a second and similar precrystallizing unit 30a. The latter is connected to the cylinders 39 of the proportioning pump 40a by conduit 37.

In the operation of this arrangement, pump 14 circulates fat from reservoir 11 around conduits 16, 19 and 20 as before. Cylinder 52 is adjusted to draw a portion, say for example 25% of the total fat to be processed, from the circulating stream through conduit 54, and inject this portion of fat, which is uncooled, into conduit 59. The remaining 75% portion of fat is drawn through conduit 21 into cooling unit 22 and precrystallizing unit 30 by proportioning pump 40a. This 75% portion of fat is cooled and precrystallized during its passage through cooling unit 22 and precrystallizing unit 30, and meets the uncooled 25% portion in conduit 59. Proportioning pump 40a draws the resultant stream through the precrystallizing unit 30a where the cooled and uncooled portions of fat are mixed, the high melting point glycerides in the uncooled 25% portion, capable of separating out as crystalline particles at the precooling temperature, being so separated during this mixing process. The temperature of the 25% uncooled portion of fat should not be so high as to cause a substantial part of the crystalline particles formed in the 75% cooled portion to re-melt.

The precrystallized fat passes into the proportioning pump 40a and is then mixed with the requisite proportion of aqueous ingredients from reservoir 12 and further processed in the manner already described.

The margarine produced by the arrangement of Figure 1 may be only firm enough to be packed after standing for a considerable time which may amount to one or two days. When only a part of the total fat to be processed is precooled, as in the arrangement illustrated in Figure 2, the margarine produced may be packed after standing for a shorter time. The time of standing necessary to produce a margarine firm enough for packing depends on the proportion of the total fat which is precooled. Thus, for example, using a certain fat blend when 75% of the total fat was precooled, as described above, this time was about four hours and when 50% was precooled, this time was reduced to two or three hours. In the latter case, however, the margarine was heavier on the palate than the product obtained when 75% of the fat was precooled. For this reason in the above example it is preferred to precool about 75% of the total fat when operating in accordance with the embodiment illustrated in Figure 2.

Figure 3:
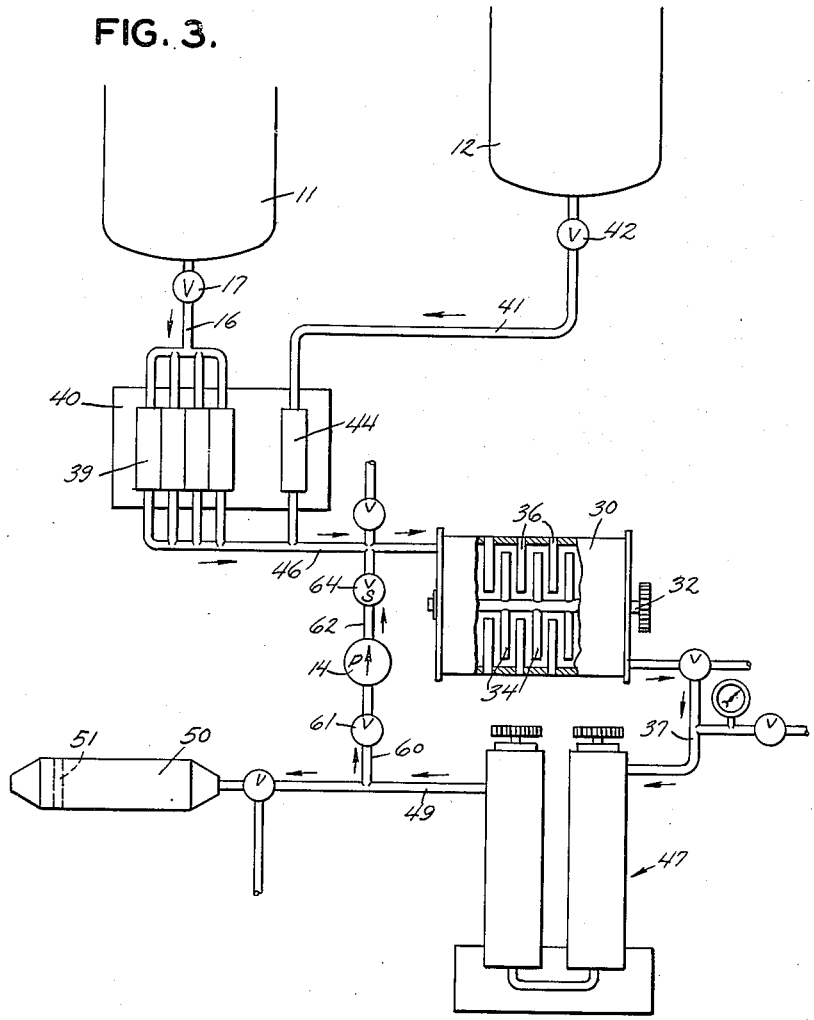
Figure 3 is a schematic flow sheet illustrating still another embodiment.

Figure 3 shows an alternative embodiment of the method for effecting the cooling of the fat by passing a part of the chilled and emulsified mixture back into the stream of fat after mixing the latter with the other ingredients of the emulsion. In this embodiment, the cooling unit 22, shown in Figures 1 and 2, is not required.

Referring to Figure 3, 11 and 12 represent reservoirs for liquid fat and aqueous ingredients of margarine, respectively, as before. Reservoir 11 is connected directly to proportioning pump 40 by conduit 16 provided with control valve 17 and reservoir 12 is connected directly to proportioning pump 43 by conduit 41 provided with control valve 42. The proportioning pump is connected by a conduit 46 to the inlet end of a single precrystallizing unit 30, the output end of which is connected to the Votator 47 by a conduit 37. This Votator is connected to the unit 50, in which crystallization is completed, by conduit 49, the unit 50 being fitted with wire mesh screens 51 as before. The suction end of a rotary pump 14 is connected to conduit 49 by a branch conduit 60 provided with a control valve 61. The delivery end of this pump is connected to conduit 46 by a branch conduit 62 fitted with a safety valve 64.

In operation, valves 17 and 42 are opened and the cylinders 39 and 44 of the proportioning pump 40 supply liquid fat and aqueous ingredients, respectively, in the correct proportion to the Votator 47 through conduit 46, precrystallizing unit 30 and conduit 37. Rapid chilling and emulsification takes place in this apparatus in the manner already described. The chilled and emulsified material enters conduit 49 where a part of it is injected back into the uncooled stream of mixed fat and other ingredients in conduit 46 through conduit 60, pump 14 and conduit 62. As the resultant mixture passes through unit 30, a heat interchange takes place between this chilled and emulsified material and the uncooled stream as a result of which high melting point glycerides crystallize out from this stream and any crystals of low melting point glycerides in the material re-melt. The mixture emerging from unit 30, which again contains high melting point glycerides in the form of crystalline particles, is chilled and emulsified in apparatus 47 as before. The portion of the chilled and emulsified material which is not fed back into conduit 46 by pump 14 is allowed to set to margarine in the unit 50 in the manner already described.

For a given blend the heaviness on the palate exhibited by the margarine produced by this embodiment may be controlled by varying the ratio of chilled fat to unchilled fat in conduit 46. This ratio is adjusted by means of pump 14 and it has been found that for most satisfactory results it should be between 0.5 to 1.5 parts of chilled fat to 1 part of unchilled fat. The precise value of this ratio for optimum results depends on the fat blend and also on the rate of throughput of mixed ingredients, the degree of refrigeration in apparatus 47 and the initial temperature of the fat in reservoir 11. In one series of experiments, a satisfactory margarine was obtained when the precrystallizing temperature was between 24° C. and 30° C., the best margarine being obtained when the temperature was 26° C. In another series of experiments, using a slightly higher throughput, higher speed of internal rotating blades, and stronger refrigeration in apparatus 47, excellent results were obtained when this temperature was 29° C. to 30° C.

As already indicated, the chilled and emulsified material issuing from the apparatus 47 and before entering tube 50 in all of the above three arrangements may be homogenized in any suitable manner, for example, by passing it through an arrangement of mesh screens and obstructions such as is described in co-pending application Serial No. 83,034.

With the arrangement of Figure 3, it is found that for a given fat blend the margarine is firmer as it emerges from the crystallizing unit 50 than with the arrangements of Figures 1 and 2, which is of advantage in packing the material. With this arrangement the product is found to be in a suitable state for feeding to a packing and wrapping machine by the method and apparatus described in U. S. Patent 2,474,136, granted June 7, 1949, on application Serial No. 664,419, filed April 23, 1946.

*Example 1*

The following fat blend was processed as described with reference to Fig. 1:

| Oil: | Per cent |
|---|---|
| Palm kernel oil | 36 |
| Whale oil, hardened to a melting point of 40–42° C | 18 |
| Groundnut oil hardened to a melting point of 40° C | 20 |
| Palm oil | 10 |
| Groundnut oil | 16 |

With this fad blend were incorporated aqueous liquids having the composition:

Milk _____ 50 litres
Water _____ 100 litres
Brine _____ 100 litres, containing 31.7 kg. salt
Preservative ____ 4.42 kg.

This liquid was used in the proportion of 1 litre to 5 kg. of oil.

In the processing, the initial temperature of the fat was 43° C. and that of the aqueous liquids 12.5° C. The fat was pre-cooled to a temperature of 22° C. the temperature of the mixed liquids entering the Votator was 25.5° C. and the emergent emulsion had a temperature of 16° C. After resting for 24 hours the product could be packed in an automatic packing machine having a worm feed. It was markedly "thinner" on the palate than a similar margarine made without precooling the fat. It had the following characteristics:

Crumbling point at 15° C., 1100 gm./sq. cm. at penetration of 0.72 mm.

Rate of fall on hot plate at 38° C., 25 mm./10 min.

Example 2

The apparatus as described with reference to Fig. 2 was used to process the fat blend and aqueous liquids described in Example 1, 75% of the fat being precooled to a temperature of 20° C. The temperature of the mixed liquids entering the Votator was 27.7° C. and the product had a temperature of 18° C.

The margarine had a rate of fall on a hot plate at 38° C. of 22 mm./10 min. and a crumbling point of 1300 gm./sq. cm. at a penetration of 0.6 mm. It could be packed after an 8 hour resting period. A product which could be packed after only a 4 hour resting period could be obtained by raising the temperature of the fat leaving the water cooler from 20° C. to 22° C., but the resulting product was thicker on the palate and had a lower rate of melting on the hot plate (19 mm./10 min.).

Example 3

In the apparatus described with reference to Fig. 3 the following fat charge was processed:

|  | Per cent |
|---|---|
| Groundnut oil hardened to a melting point of 33° C. | 70 |
| Groundnut oil | 30 |

The same aqueous liquids as described in Example 1 were used, in the same proportion. The initial temperature of the oil was 42° C., and that of the aqueous liquids 11° C. The ratio of chilled emulsion returned through the system 60, 61, 14, 62, 64, to unchilled fat and aqueous liquid entering the cooling system was 0.86:1, when the temperature of the mixture leaving the precrystallising unit was 26.5° C. The product was hard when newly made but softened during storage for 24 hours. It could be directly packed by means of the apparatus described in British patent specification No. 590,935, when the tube 50 was 1.2 metres long and jacketed with warm water. The product had a good "thinness," and showed a rate of fall on the hot plate at 38° C. of 39 mm./10 min., and a crumbling point at 15° C. of 800 gm./sq. cm. at a penetration of 1.0 mm.

It is to be understood that the invention is not limited to the particular embodiments described above, and that many modifications will readily become apparent to those skilled in the art upon reading this description. All such modifications are intended to be included within the scope of the invention as defined in the appended claims.

We claim:

1. A continuous method of making margarine which comprises cooling to a temperature between about 23° C. and 34° C. and agitating a stream of liquid fat to crystallize selectively the higher melting point glycerides in said stream, mixing the fat with the aqueous ingredients, and rapidly chilling and emulsifying the resultant mixture.

2. A continuous method of making margarine which comprises cooling and agitating a stream of liquid fat to crystallize the higher melting point glycerides in said stream, mixing the fat with the aqueous ingredients, and rapidly chilling and emulsifying the resultant mixture.

3. A method as defined in claim 2 wherein the stream of fat is cooled and agitated prior to being mixed with the aqueous ingredients.

4. A method as defined in claim 2 wherein the fat, in the form of a single stream, is cooled and agitated prior to being mixed with the aqueous ingredients.

5. A method as defined in claim 2 wherein a first stream of fat is cooled and agitated, and mixed with a second stream of fat and further agitated prior to being mixed with the aqueous ingredients.

6. A method as defined in claim 2 wherein the stream of fat is cooled and agitated after being mixed with the aqueous ingredients.

7. A method as defined in claim 2 wherein the stream of fat is cooled and agitated after being mixed with the aqueous ingredients and the cooling is effected by recycling a portion of the rapidly chilled mixture.

8. A margarine product prepared by the method defined in claim 2, said product being capable of sinking at least 15 mm. in 10 minutes when a ½ pound, 4" x 2½" x 1½" block thereof is placed with its 2½" x 1½" face down, upon a hot plate maintained at a temperature of 38° C. and under a load of 500 grams.

ARTHUR DACRE WILSON.
HENRY BOWEN OAKLEY.
JOHN ROURKE.

REFERENCES CITED

The following references are of record in the file of this patent:

UNITED STATES PATENTS

| Number | Name | Date |
|---|---|---|
| 1,144,539 | Grelck | June 29, 1915 |
| 2,098,010 | Newton et al. | Nov. 2, 1937 |
| 2,197,457 | Werk et al. | Apr. 16, 1940 |
| 2,434,429 | Nelson | Jan. 13, 1948 |